3,248,271
SHAPED OXYMETHYLENE THERMOPLASTIC POLYMER AND METHOD OF SURFACE TREATING SAME
Francis J. Rielly, Chatham, and Paul F. Del Conte, Dover, N.J., assignors to Celanese Corporation of America, New York, N.Y., a corporation of Delaware
No Drawing. Filed May 8, 1961, Ser. No. 108,318
4 Claims. (Cl. 156—2)

This invention relates to shaped structures made of thermoplastic oxymethylene polymers and particularly to shaped structures treated to make their surfaces adherent to inks, lacquers and metallizing treatments.

High molecular weight, thermally stable, thermoplastic oxymethylene polymers having successively recurring —$CH_2O$— groups may be prepared by polymerizing formaldehyde or by polymerizing trioxane which is a trimer of formaldehyde. The polymers may be fabricated into shaped structures as by compression or injection molding or extrusion. The shaped structures have glossy surfaces to which decorative and other coatings adhere poorly.

It is an object of this invention to provide shaped structures to which surface coatings will adhere and to provide a method for making such structures.

In accordance with one aspect of this invention there is provided a shaped structure of an oxymethylene thermoplastic polymer having a surface etched with an oxidizing acid.

In accordance with this invention the surface of the shaped structure is etched by subjecting it to an acidic and oxidizing environment. Preferably the structure is treated with an oxidizing acid for a period sufficient to each its surface. The oxidizing acid etching causes the surface to become adherent to surface coatings although the reason for this is not understood. Etching with strong alkali or mechanical roughening of the surface will not improve adherence.

The oxymethylene polymers treated in this invention may be homopolymers or, preferably, may be copolymers having 0.5 to 20 wt. percent of oxyalkylene groups with adjacent carbon atoms. Most preferably, copolymers containing oxymethylene and oxyethylene groups are used. Suitable copolymers, e.g., of trioxane and a cyclic ether having adjacent carbon atoms are disclosed in Patent No. 3,027,352 issued to Walling, Brown and Bartz.

The shaped structures may be prepared from such polymers by conventional shaping procedures including compression molding, injection molding, extrusion, blow molding and pressure forming. Typical shaped structures which may be made of homopolymers or copolymers include sheet and film, bottles and pressurized containers, bearings and gears, coil and leaf springs, spring liner, conveyor belts and links, bowling pins and balls, striker plates, bushings, automative hub caps and trim, instrument clusters, gasoline tanks, carburetors, distributor caps, fan blades and pulleys, under-hood housings, brake fluid containers, gaskets, clamps, door handles, knobs, panels, bezels, fasteners, zippers, bottle caps, cartridge and shell casings, clothes and dishwashing machine parts, soap receptacles, and plumbing fixtures.

The oxidizing environment preferably comprises a strongly oxidizing, strongly acidic oxidizing acid, such as chromic acid, nitric acid, sulfuric acid and mixtures of such acids. Non-oxidizing strong acids, such as hydrochloric acid and glacial acetic acid, may be blended with the oxidizing acids. The surface of the shaped structure is contacted with the oxidizing acid for a period sufficient to etch the surface. Overexposure will lead to deep channelling of the surface and finally to complete disintegration of the shaped structure since oxymethylene polymers decompose to formaldehyde in strongly acidic media.

Usually it is preferred to limit exposure to ten seconds or less.

The oxidizing acidic medium is brought into contact with the surface of the shaped structure in any suitable manner, as by dipping, spraying or brushing when the oxidizing medium is a liquid. If desired, some surfaces or portions of surfaces may be protected from etching by a coating which is resistant to the acidic medium such as a coating of paraffin or of asphaltum.

The temperature of the surface oxidation will vary with the time of exposure and the nature of the oxidizing medium. For chromic acid, room temperature (65–85° F.) is very suitable.

Upon completion of the etching treatment, the shaped structure may be washed and dried and is then adherent to surface coating treatments. There is substantially no degradation of the polymer except at the surface of the structure and its physical properties are substantially unimpaired.

In accordance with a preferred aspect of this invention the oxidizing treatment is followed by a treatment which produces cross-linked molecules at the surface of the shaped polymer. In order to accomplish this the structure is contacted under formaldehyde-generating conditions with a reactant capable of reacting with formaldehyde to form an interpolymer therewith.

The reactant is usually a relatively simple organic compound having two or more reactive hydrogen atoms capable of reacting with formaldehyde by condensation to form methylene groups which act as links between the molecules of the reactant. When the reactant has only two reactive hydrogen atoms, a linear polymer is formed. When the reactant has three or more reactive hydrogen atoms and sufficient formaldehyde is present, a cross-linked three dimensional polymer or space polymer is formed.

The structure may, for example, be contacted with a phenol solution, containing potassium hydroxide as a catalyst and heated to form a surface coating of phenol-formaldehyde resin.

In addition to phenol, other formaldehyde-reactants capable of forming space polymers may be used, including urea, melamine, casein, aniline, cresols and xylenols. The formaldehyde-reactant is preferably contacted with the surface in a concentration and amount sufficient to provide a unimolecular layer of formaldehyde-reactant on the entire surface. When phenol is the formaldehyde-reactant it is usually used in concentration from about 1 to 90 weight percent in a solvent such as water or alcohols.

The formaldehyde-reactant generally contains a catalyst for reaction with formaldehyde, usually a strong mineral acid or a strong base in an amount between about 0.01 and about 2 wt. percent based on the weight of the formaldehyde-reactant.

The temperature and duration of the heating step varies with the nature of the formaldehyde-reactant, but is usually at least 100° C. and at least 5 minutes. With phenol, the temperature is preferably between about 100° and about 150° C. and the duration is between about 2 hours and about 15 minutes.

Commercially available inks, such as flexographic inks may be printed onto the structures treated as described above and upon drying the deposited ink is adherent. Similarly, commercially available lacquers, pigmented or unpigmented, may be applied to the structures treated as described above to produce adherent coatings.

It is often desirable to precoat the treated shaped structure with a prime coat of clear lacquer prior to applying ink or a pigmented lacquer. Methyl methacrylate lacquers, melamine-formaldehyde lacquers and urea-formaldehyde lacquers are suitable.

A precoat layer is also desirable when the shaped structure is to be subjected to a metallizing operation. Conventional vacuum metallizing techniques may be used and the shaped structures are preferably given a top coat with a clear lacquer which may or may not be identical with the lacquer used in the base coat.

*Example I*

Two plaques (3" x 5") of an oxymethylene copolymer containing 2.5% ethylene oxide as comonomer, stabilized with 0.5 wt. percent of 2 2' methylenebis(4 methyl 6 tert butyl phenol) and 0.5 wt. percent of cyanoguanidine was subjected to chromic acid treatment by dipping it into chromic acid at room temperature for a period of 4 to 10 seconds. The chromic acid was a mixture of 100 parts by weight of concentrated sulfuric acid, 15 parts by weight of potassium dichromate and 50 parts water. After the chromic acid treatment the plaques were washed with water and dried (in air at room temperature) and a 90% aqueous phenol solution containing 1% of KOH was applied by dipping at room temperature. The wet plaques were heated in a 140° F. oven for ½ hour.

Two other plaques, used as controls, were not given the pretreatment described above.

A clear methylmethacrylate lacquer (Du Pont 1234) was applied by dipping to one pretreated and one control plaque and baked. Both plaques were then subjected to a vacuum metallizing treatment to deposit a thin layer of aluminum and both were then coated with a top coat of a clear polymethylmethacrylate lacquer (Du Pont 1234) applied by dipping and baked at 150–200° F. The pretreated plaque was designated as "A" and the control as "B."

Another commercial lacquer (Red Spot SM1212) was applied to one pretreated and one control plaque in the same manner as above and both plaques were subjected to a vacuum metallizing treatment as described above. Both plaques were then coated with a top coat of the same lacquer in the manner described above. The pretreated plaque was designed "C" and the control "D."

The adherence of the metallized base coat and of the top coat were tested by pressing a strip of pressure sensitive transparent adhesive tape (Scotch tape) over an area of the surface which was cross hatched with ⅛" squares and then stripping the tape away. Poor adhesion was indicated by the removal of substantially all of the coating from the plaque by the tape while excellent adhesion was indicated by the removal of substantially none. The results were as follows:

TABLE I

| Plaque | Metallized Base Coat | Top Coat |
|---|---|---|
| A | Excellent | Good. |
| B | Poor | Poor. |
| C | Excellent | Excellent. |
| D | Fair | Poor. |

*Example II*

Example I was repeated, except that the plaques were made of an acetylated oxymethylene homopolymer resin stabilized with 4,4' butylidene(3 methyl 6 tert-butylphenol) and a synthetic polyamide. The plaques were designated as A', B', C' and D' corresponding in treatment to A, B, C and D, above. The results were as follows:

TABLE II

| Plaque | Metallized Base Coat | Top Coat |
|---|---|---|
| A' | Excellent | Good. |
| B' | Poor | Poor. |
| C' | Excellent | Poor. |
| D' | Poor | Poor. |

*Example III*

Plaques of an oxymethylene copolymer similar to that of Example I and an oxymethylene homopolymer similar to that of Example II were dipped into a mixture containing 256 parts (by volume) of concentrated sulfuric acid, 128 parts of concentrated nitric acid, 1 part of concentrated hydrochloric acid and 32 parts of water. The plaques were then washed successively with water, sodium carbonate solution (10%) and water and then air dried.

A commercial clear lacquer (Du Pont RK5752) was applied by dipping and the plaques were baked at 150° to 200° F. After vacuum metallizing with aluminum, a top coat of the same lacquer was applied in a similar manner. Adhesions between coatings and the surface of the plaques was good.

*Example IV*

The pretreatment of Example I was repeated on similar oxymethylene copolymer plaques except that the phenol-KOH solution was in a 50% ethyl alcohol=50% water solution. The precoat metallizing and top coat were applied as in Example III. Adhesion was good.

It is to be understood that the foregoing detailed description is given merely by way of illustration and that many variations may be made therein without departing from the spirit of our invention.

Having described our invention what we desire to secure by Letters Patent is:

1. Method of treating a shaped structure of an oxymethylene thermoplastic polymer which comprises subjecting said structure to an oxidizing environment to etch its surface and thereafter contacting said structure with a reactant mixture capable of reacting with formaldehyde to form a space polymer.

2. The method of claim 1 wherein said oxidizing environment comprises an oxidizing acid and said reactant mixture comprises phenol.

3. A shaped structure of an oxymethylene thermoplastic copolymer having successively recurring oxymethylene groups and having oxyalkylene groups with adjacent carbon atoms, said copolymer being a copolymer of trioxane and a cyclic ether having adjacent carbon atoms, and said structure having a surface etched with an oxidizing acid.

4. Method of treating a shaped structure of an oxymethylene thermoplastic copolymer having successively recurring oxymethylene groups and having oxyalkylene groups with adjacent carbon atoms, said copolymer being a copolymer of trioxane and a cyclic ether having adjacent carbon atoms, wherein said method comprises subjecting said structure to treatment with an oxidizing acid for a period sufficient to etch the surface of the structure.

References Cited by the Examiner

UNITED STATES PATENTS

Re. 24,062   9/1955   Horton _____ 117—47

(Other references on following page)

UNITED STATES PATENTS

| | | | |
|---|---|---|---|
| 1,930,587 | 10/1933 | Dennison | 156—2 |
| 2,153,525 | 4/1939 | Snelling | 117—47 |
| 2,536,183 | 1/1951 | Jamieson | 117—47 |
| 2,666,693 | 1/1954 | Meretey | 156—2 |
| 2,886,471 | 5/1959 | Bruce | 117—47 |
| 2,970,078 | 1/1961 | Nielsen | 117—47 |
| 2,985,623 | 5/1961 | Schweitzer et al. | 260—67 |
| 3,022,192 | 2/1962 | Brandt | 156—307 |
| 3,029,121 | 4/1962 | Collins | 117—47 |
| 3,116,267 | 12/1963 | Dolce | 260—45.95 |
| 3,161,616 | 12/1964 | Brown et al. | 260—67 |

FOREIGN PATENTS

| | | |
|---|---|---|
| 1,226,434 | 2/1960 | France. |

ALEXANDER WYMAN, *Primary Examiner.*

CARL F. KRAFFT, HAROLD ANSHER, EARL M. BERGERT, *Examiners.*